S. STEPHENS.
SPRAYING DEVICE.
APPLICATION FILED APR. 18, 1911.
1,016,109.
Patented Jan. 30, 1912.
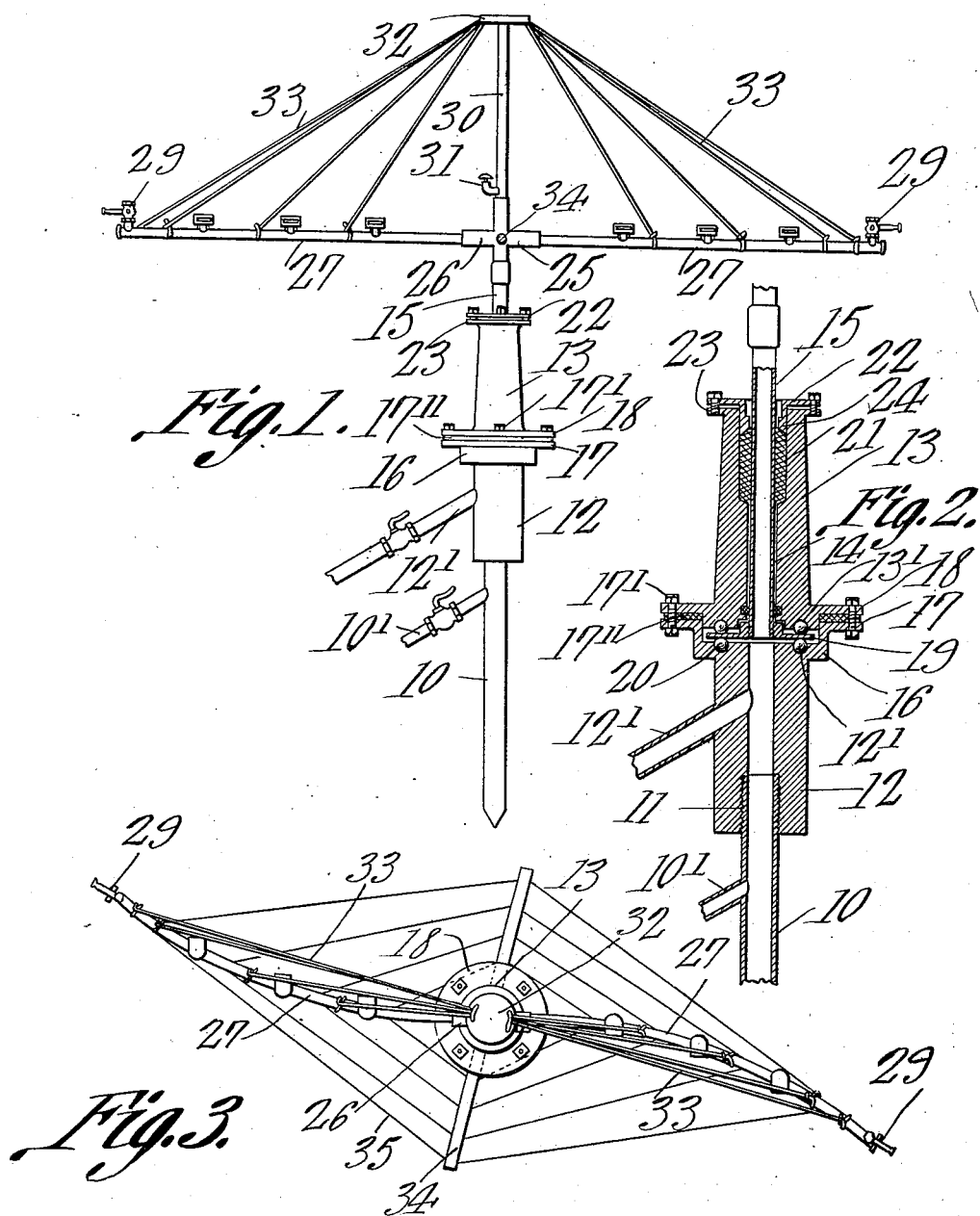
Witnesses
Inventor
S. Stephens,
by C. A. Snow & Co.
Attorneys

UNITED STATES PATENT OFFICE.

STERLING STEPHENS, OF BUSHNELL, FLORIDA.

SPRAYING DEVICE.

1,016,109.  Specification of Letters Patent.  Patented Jan. 30, 1912.

Application filed April 18, 1911. Serial No. 621,917.

*To all whom it may concern:*

Be it known that I, STERLING STEPHENS, a citizen of the United States, residing at Bushnell, in the county of Sumter and State of Florida, have invented a new and useful Spraying Device, of which the following is a specification.

This invention relates to an improvement in spraying devices.

The primary object of said invention is to provide a spraying device which will be particularly adapted for irrigating purposes.

A further object of the invention is to provide a water distributing member which will be simple in construction and economical to manufacture and which may be conveniently transported.

In the drawings:—Figure 1 is a side elevation of the device. Fig. 2 is a view partly in section showing the manner of mounting the rotary distributer, and Fig. 3 is a top plan view of the device.

In the drawings 10 designates a hollow stand pipe or support which may be inserted in the ground or which may be suitably positioned on a truck by means of which the device may be transported. This stand pipe extends into the bore 11 of the lower section 12 of the head, said head being formed in two sections, the upper section 13 being provided with a bore 14, the two sections being bolted together, the bore in the upper section receiving a rotary distributing pipe 15. The lower section 12 is formed adjacent its upper end with an enlargement 16 which is provided with an annular flange 17, the flange 17 being bolted to the corresponding flange 18 arranged on the section 13, the end portion of the section 13 being enlarged and adapted to rest within the enlargement 16 of the lower section. The end portion of the member 13 is spaced from the end portion of the member 12, the degree to which said end portions are spaced being regulated by the securing devices 17' which pass through the annular flanges, there being a gasket 17'' arranged between said flanges.

As before stated the rotary distributing pipe is arranged within the bore of the member 13 and to the end portion of the pipe 15 is secured a plate 19, said plate being formed with a screw threaded boss which receives the end portion of said pipe, the plate being of a diameter slightly less than the distance between the walls of the enlargement 16, the ends of the members 12 and 13 being formed with ball races 12' and 13' receiving balls 20 which contact with either face of the plate 19, thus facilitating the rotation of said plate. The bore 14 is increased as it nears the end portion of the member 13 and the space between the walls of this bore and the pipe 15 is filled with a suitable packing 21, the packing being held in place by suitable rings 22, said rings being secured to a flange 23 formed integral with the upper end of the member 13. The annular extensions 24 of said rings extend within the bore their beveled end portions contacting with the packing, said annular extensions being spaced from the rotating distributing pipe 15 to permit the same to revolve freely.

Secured to the pipe 15 at its upper end is a T coupling 25 the extensions 26 of which support the curved hollow distributing arms 27 on which the spraying devices are mounted, a nozzle 29 being positioned at either end of each hollow arm. The central extension of the T-joint 25 receives the vertically extending pipe 30 which is provided at a point adjacent the T-joint with a sprayer 31. A plate 32 is arranged on the end portion of the pipe 30 and suitable guy ropes or wires 33 extend from either side of said plate and are secured at various points to the hollow arms to support the same. In order to properly support the arms 27 a plurality of arms 34 are supported by the T 25 and to said arms are secured wires 35 which are also secured to the arms 27, the wires 35 assisting the wires 33 in supporting the distributing arms.

The stand pipe 10 is provided with an extension 10' which is disposed at an angle and which forms an inlet for the water, the lower portion 12 of the head being provided with an extension 12'' disposed at the same angle as the extension 10' both extensions being connected with suitable supply pipes which are in turn connected with a main supply pipe. It will be seen that the water which enters the bore of the lower section 12 will rise through the pipe 15 and be distributed through the hollow curved arms 27, the force of the water rotating the distributer, the peculiar curvature of the arms and the arrangement of the spraying devices and nozzles causing the water to be distributed in sheets.

Particular attention is called to the manner of supporting the pipe 15 and the manner in which said pipe supports the distributing members, the weight being so centered as to fall on the plate 19, the movement of said plate being facilitated by the balls 20. It will be noted that the arms are supported centrally and adjacent their ends by the guy ropes or wires 33, the weight being transferred to the vertically extending pipe 30 which practically forms a continuation of the pipe 15, the weight being thus directed to the plate 19, the pipe 15 being efficiently supported by the member 13.

The many advantages of a spraying device of this character will be clearly apparent, as it will be noted that the same can be easily and cheaply manufactured and the various parts readily assembled.

What is claimed is:—

In a spraying device, a supporting member formed in two hollow sections, a distributing pipe arranged in the upper of said sections, said pipe being spaced from the same, one end of the lower member being formed with a recess adapted to receive the lower end of the upper member, the lower end of the upper member and the upper end of the lower member being spaced, said distributing pipe extending beyond the lower end of the upper member, a plate supported by said pipe, said plate being formed with a boss arranged to extend within a recess formed in the lower face of the upper member, and balls interposed between both faces of said plate and said members.

In testimony that I claim the foregoing as my own, I have hereto affixed my signature in the presence of two witnesses.

STERLING STEPHENS.

Witnesses:
W. A. COLLINS,
C. C. BEVILL.

---

Copies of this patent may be obtained for five cents each, by addressing the "Commissioner of Patents, Washington, D. C."